April 13, 1937.　　　　F. M. HESS　　　　2,076,816
APPARATUS FOR DETERMINING THE CONSISTENCY OF LIQUIDS
Filed Oct. 7, 1933
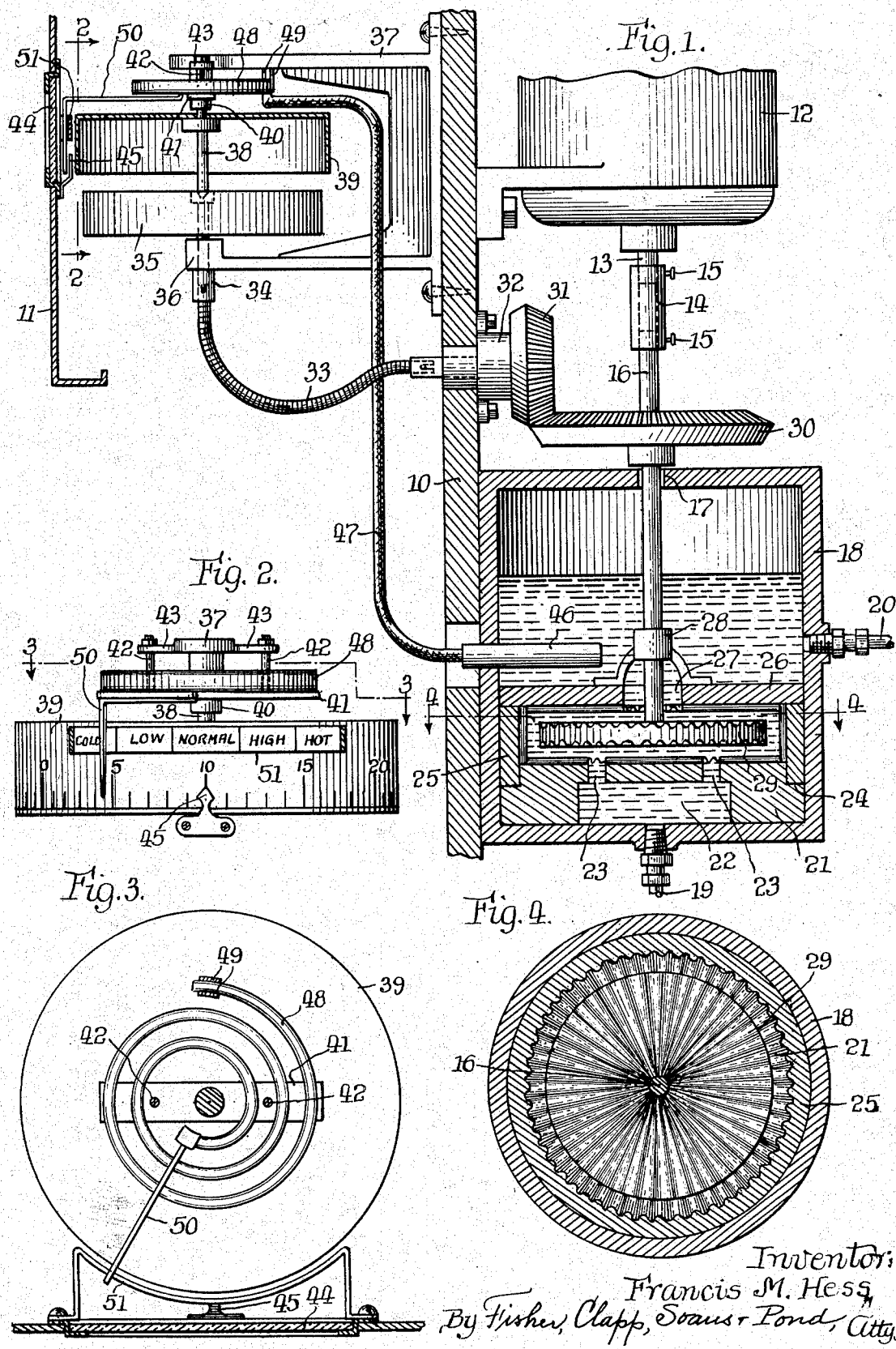

Patented Apr. 13, 1937

2,076,816

UNITED STATES PATENT OFFICE 2,076,816

APPARATUS FOR DETERMINING THE CONSISTENCY OF LIQUIDS

Francis M. Hess, Chicago, Ill.

Application October 7, 1933, Serial No. 692,591

5 Claims. (Cl. 265—11)

This invention relates to devices for testing the consistency or viscosity of oils and other liquids; and its chief intended application is as an accessory for automobiles and other motor vehicles to enable the owner or driver of a car to ascertain at a glance while driving or at rest whether or not the lubricating oil in his car is pure and in good condition and of the correct consistency for most efficiently serving the motor and bearings under any and all operating temperatures.

The device may also be usefully employed at service stations for testing stocks of oil or at refineries as a processing control. It may also be used in many other industrial activities and with other liquids, such as molasses, glycerine, starch, glue, cement, tar, paint, vegetable oils, and many other liquids.

The chief objects of the invention are, first to provide a simple and reliable device by which all changes in the consistency or fluidity of a body of liquid may be visually registered, second, to provide additional means whereby fluidity changes caused by heat alone are visually registered and, third, to provide a device that will visually register the change in the liquid due to adulteration or fouling, breaking down or other causes that may partially disqualify the body of liquid for the purpose intended. This last named function of the device is employed on automobiles, motor vehicles, and aeroplanes to show the condition of crank case oil and when it requires adjustments on account of dilution by gasoline leakage or entire replacement due to fouling, breaking down, or other causes.

In the accompanying drawing I have illustrated one practical form in which the invention may be embodied, the device shown being more particularly, although not exclusively, designed as an accessory for automobiles and motor vehicles, and referring thereto—

Fig. 1 is an elevation, partly in vertical section, of the principal operating parts.

Fig. 2 is a detail view of the associated viscosity and temperature indicating means.

Fig. 3 is a top plan view, partly in horizontal section, on the line 3—3 of Fig. 2.

Fig. 4 is a horizontal section on the line 4—4 of Fig. 1.

Referring to the drawing, 10 may designate an upright supporting plate on which the principal parts of the device are mounted, and 11 may designate the usual instrument board of an automobile. Bolted to the support 10 is a vertically disposed small constant torque electric motor 12, the armature shaft 13 of which is connected by a sleeve 14 and binding screws 15 to the upper end of a vertical shaft 16. The shaft 16 extends downwardly through an opening 17 in the top wall of a box 18 that is suitably secured to the upright 10 and constitutes an oil chamber. With the bottom wall of the box 18 communicates a pipe 19 leading from the crank case, through which oil is forced by a pump, while a pipe 20 communicating with a side wall of the box leads back to the crank case. In the bottom of the box 18 is a block 21 chambered on its lower side as shown at 22 and formed with a plurality of ducts 23 leading from the top of the chamber 22. The upper portion of the block 21 is narrowed to form an annular ledge 24 on which is seated a ring 25, and on the upper edge of the ring 25 rests a plate 26 formed with a central hole 27. The shaft 16 extends through the hole 27, being steadied by a bearing 28 supported on plate 26, and to the lower end of the shaft 16 is secured a disc 29 that constitutes an oil agitating member. The upper and lower faces of the disc 29 are preferably radially corrugated, and its periphery may also be transversely corrugated as clearly shown in Fig. 4, and the top surface of the block 21, the bottom surface of the plate 26, and the inner vertical surface of the ring 25 are preferably similarly corrugated. The oil entering the box through the pipe 19 floods the chamber 22, the ducts 23, the circular chamber bounded by the block 21, ring 25, and plate 26, the hole 27, and the space above the plate 26 up to or above the exit pipe 20, so that the disc 29 is wholly immersed at all times in the body of oil in the box 18.

Keyed to the shaft 16 above the box 18 is a miter gear 30 that drives a miter gear 31 journaled in a bearing 32 attached to the support 10. The shaft of the gear 31 is connected by an ordinary flexible cord 33 to the spindle 34 of a rotary magnet 35 of the type employed in the well known magnetic speedometer, the shaft 34 being journaled in a bearing 36 formed on the lower arm of a horizontal U-shaped bracket 37 attached to the support 10. Supported by a point bearing on the upper end of the magnet shaft 34 is the spindle 38 of a circular scale 39 similar to the usual speedometer scale but, as shown in Fig. 2, graduated in numbers indicating viscosity. The upper end of the spindle 38 has a similar point bearing in the lower end of a bearing boss 40 on the lower side of a support bar 41 (Fig. 3). This support bar 41 is suspended by a pair of bolts 42 from lateral ears or lugs 43 formed on the upper arm of the U-shaped bracket 37.

In the instrument board 11, opposite the scale 39, is the usual window 44 equipped with a fixed pointer 45 that cooperates with the scale 39. As is usual in magnetic speedometers, the movement of scale 39 under the pull of the magnet is resisted by a helical hair spring (not shown) attached at one end to the spindle 38 and anchored at its other end to a fixed member, such as the bar 41, the spring tending to return the scale to zero position. An example of this is shown in patent to Stewart, No. 1,054,997, March 4, 1913.

The device as thus far described is complete for effecting the first stated object or purpose of the invention, namely, to visually register changes in the consistency or fluidity of the oil flowing through the box 18. The numerals appearing on the scale 39 are what are known as viscosity numbers; that is, they represent the viscosity of different oils at an arbitrary temperature of 130° F. This device may be adjusted to this type of standard or variation of the same. Moreover, as is well known, any body of oil, of whatever degree of viscosity, becomes heated in use and consequently becomes more liquid as its temperature rises. Now, the motor 12 exerts a constant and uniform drive on the agitator 29, and the speed of rotation of the latter is controlled by the drag of the oil on the agitator and on its surrounding walls, and, as the oil becomes heated and more liquid, this drag decreases and consequently the speed of the agitator increases. These variations of speed are transmitted through the described drive to the magnet 35 and consequently to the scale 39, so that the extent of movement of the latter past the pointer 45 indicates to the driver the relative fluidity of the oil at varying speeds of travel and temperatures.

To effect the second stated object of the invention, namely, to visually register changes in the body of the liquid that are due to change in temperature, I provide a thermometer register which will next be described. In the form herein shown, 46 designates a thermometer well mounted in a wall of the box 18 and submerged in the body of oil. From the well 46 a tube 47 extends upwardly and is connected at its upper end into the outer end of a Bourdon tube or spiral 48 that is supported on the bar 41. Said outer end of the tube 48 may be clamped between a pair of pins 49 depending from the upper arm of the bracket 37, as shown in Fig. 1, so as to hold said outer end stationary. The inner end of the tube 48 has mounted thereon a pointer 50, the outer end portion of which is bent downwardly to overlie the scale 39. Parts 46, 47, and 48 are filled with a gas such as air.

By preliminary test the viscosity gauge and the thermometer last described are so related in operation that, so long as the body of oil being tested is pure and the fluidity changes are due solely to temperature changes, the scale 39 and the needle 50 will both move in the same direction and at the same speed, so that there will be no relative movement between the two. However, if the crank case oil becomes more or less diluted by leakage of gasoline, the fluidity of the oil will be increased over what its fluidity would be due to heat alone, and consequently the scale 39 will move slightly ahead or in advance of the needle 50. This relative movement will show the driver at a glance that his oil is impure and should be changed to avoid injury to the motor and the bearings, and constitutes the means by which the third stated object of the invention is accomplished.

From the foregoing it will be seen that the viscosity of the oil forms one variable and its temperature forms another variable; and that the temperature indicator forms a datum for the viscosity indicator.

In the case of the ordinary magnetic speedometer, the dial has a movement of about three-fourths of one complete revolution but, for the use herein contemplated, the several grades of oil used in different seasons of the year will involve a movement of dial 39 much less than that. The maximum range of movement of pointer 50 would not be more than 60°, and, to simplify the reading, I preferably equip the instrument board with a fixed arcuate gauge strip 51 attached thereto in the manner clearly shown in Fig. 3, the exposed face of said gauge strip being marked with divisions indicated as "Cold", "Low", "Normal", "High" and "Hot". The pointer 50 plays over this strip, so that the position of the pointer opposite any one of these ranges discloses the approximate temperature condition of the oil.

Thus the device herein presented shows at all times when the car is running, the condition of the oil in terms of viscosity as well as temperature. As a matter of adaptation, the resistance offered by the oil to rotation of the disc 29 may be regulated by increasing or decreasing the height of the chamber in which it rotates. The disc 29 should occupy a central position in said chamber, and such regulation may be effected by substituting for the ring 26 a higher or lower ring, and raising or lowering the shaft 16 by adjusting the upper end of the latter in the sleeve 14. The corrugated surfaces of the chamber in which the disc rotates are severe enough to get a wide range of speeds with but a small change in viscosity.

I have herein described a complete apparatus to carry out the several functions of the invention. I do not desire to limit myself to this special apparatus. For example, one of the objects of the invention is to visually register all changes in the consistency or fluidity of the oil flowing through box 18, regardless of the cause of said change.

To do this I have employed a motor to furnish a constant impulse to a shaft 16 and a solid member 29 (disc). This impulse will create a rotation of disc 29 and the rate of rotation will be controlled by the viscosity of the oil. This rate of rotation is measured by the extent of movement of circular dial 39 and indicated by fixed pointer 45. The numerals on scale 39 are viscosity numbers and represent a predetermined standard.

It is evident from the foregoing that a broad deviation from the construction of said rotating member and chamber is possible and still be within the spirit of the invention. This is likewise true of the measuring device for measuring the rotation.

Another object of the invention is to visually register changes in the body of the liquid that may be caused by change in temperature. To accomplish this I have employed a Bourdon tube as the pointer actuator. Other mechanical means could be employed here and accomplish the same result. Still other means could be employed and be within the spirit of the invention.

To know the change in viscosity due to fouling or adulteration, the Bourdon tube and pointer 50 not only act as the means to simultaneously correct the result for change in temperature but also register the indicating temperature on gauge strip 51 that is affecting the consistency of the liquid.

I claim:

1. In a viscosity testing apparatus for liquids, the combination of a liquid container, a liquid agitating member mounted to move in a body of liquid in said container, power actuated means for driving said agitating member under a constant force, an indicator of viscosity variations comprising a rotatable dial calibrated in degrees of viscosity, a fixed pointer associated therewith, and driving means for said dial geared to said power actuated means; and an indicator of temperature variations comprising a movable pointer visually associated with said dial in such a manner that said pointer forms a datum for said dial, and means actuated by changes of temperature in said body of liquid for moving said movable pointer in the same direction as said dial; said indicators being so coordinated in operation that said dial and movable pointer will remain relatively stationary so long as fluidity changes in the body of liquid are due solely to temperature changes thereof.

2. In a viscosity testing apparatus for liquids, the combination of a liquid container, a liquid agitating member mounted to move in a body of liquid in said container, power actuated means for driving said agitating member under a constant force, an indicator of viscosity variations comprising a rotatable dial calibrated in degrees of viscosity, a fixed pointer associated therewith, and driving means for said dial geared to said power actuated means; and an indicator of temperature variations comprising a movable pointer visually associated with said dial in such a manner that said pointer forms a datum for said dial, and a temperature responsive device of the gas expansion type subject to changes of temperature in said body of liquid operating to move said movable pointer in the same direction as said dial; said indicators being so coordinated in operation that said dial and movable pointer will remain relatively stationary so long as fluidity changes in the body of liquid are due solely to temperature changes thereof.

3. In a viscosity testing apparatus, the combination of a chamber and means for filling the same with liquid to be tested, a rotary disc in said chamber having corrugated surfaces, a constant torque motor and driving connections therefrom to said disc, an indicator of viscosity variations comprising a rotatable dial calibrated in degrees of viscosity, a fixed pointer associated therewith, and a driving magnet for said dial geared to said driving connections; and an indicator of temperature variations comprising a movable pointer visually associated with said dial in such a manner that said pointer forms a datum for said dial, a thermometer well of the gas expansion type subject to changes of temperature of the liquid in said chamber, and means actuated by the expansion of gas in said thermometer well operating to move said movable pointer in the same direction as said dial; said indicators being so coordinated in operation that said dial and movable pointer will remain relatively stationary so long as fluidity changes in the liquid in said chamber are due solely to temperature changes thereof.

4. In a viscosity testing apparatus for liquids, the combination of a liquid container, a liquid agitating member mounted to move in a body of liquid in said container, power actuated means for driving said agitating member under a constant force, an indicator of viscosity variations comprising a movable graduated member and operating means therefor driven by said power actuated means, and a movable index actuated according to temperature variations of the liquid and visually associated with said movable graduated member in such a manner that said index forms a datum for said movable graduated member, and means actuated by changes of temperature in said body of liquid for moving said index in the same direction as said movable graduated member.

5. In a viscosity testing apparatus for liquids, the combination of a liquid container, a liquid agitating member mounted to move in a body of liquid in said container, power actuated means for driving said agitating member under a constant force, an indicator of viscosity variations comprising a movable graduated member and operating means therefor driven by said power actuated means, and an indicator of temperature variations comprising a movable index actuated according to temperature variations of the liquid and visually associated with said movable graduated member in such a manner that said index forms a datum for said movable graduated member, and means actuated by changes of temperature in said body of liquid for moving said index in the same direction as said movable graduated member; said indicators being so coordinated in operation that said movable graduated member and said index will remain relatively stationary so long as fluidity changes in the body of liquid are due solely to temperature changes thereof.

FRANCIS M. HESS.